United States Patent [19]
Ishikawa et al.

[11] Patent Number: 5,799,440
[45] Date of Patent: Sep. 1, 1998

[54] FLOATING ISLAND WITH WATER-PURIFYING EFFECT, PLANT-CULTIVATION BAG AND METHOD FOR PURIFYING WATER

[75] Inventors: Masatoshi Ishikawa, Mie; Kunio Mizuno, Aichi, both of Japan

[73] Assignees: Inoac Corporation; Dia Corporation Ltd., both of Nagoya; Ishikawasangyo Yugenkaisha, Kuwana-Gun, all of Japan

[21] Appl. No.: 558,855

[22] Filed: Nov. 16, 1995

[30] Foreign Application Priority Data

Apr. 11, 1995 [JP] Japan ................... 7-111318

[51] Int. Cl.$^6$ ............................................. A01G 31/02
[52] U.S. Cl. ............................ 47/65; 47/1.4; 47/66
[58] Field of Search ................ 47/65, 66–5, 1.4 R

[56] References Cited

U.S. PATENT DOCUMENTS

| | | | |
|---|---|---|---|
| 4,607,454 | 8/1986 | Koike | 47/65 F |
| 5,324,657 | 6/1994 | Tanny | 47/65 F |
| 5,337,516 | 8/1994 | Hondulas | 47/65 |

FOREIGN PATENT DOCUMENTS

| | | | |
|---|---|---|---|
| 0641744 | 3/1995 | European Pat. Off. | C02F 3/02 |
| 184112 | 9/1985 | Japan | 47/65 F |
| 8402625 | 3/1986 | Netherlands | 47/65 F |
| 1031309 | 6/1966 | United Kingdom | 47/65 F |

OTHER PUBLICATIONS

Patent Abstract of Japan, vol. 018, No. 381 (C–1226), Jul. 18, 1994, & JP A 06 106185 (Hayashi Prod. Corp.), Apr. 19, 1994, *abstract.

Patent Abstracts of Japan, vol. 018, No. 191 (C–1186), Apr. 4, 1994, & JP A 05 345187 (Nippon Solid Co., Ltd.), Dec. 27, 1993, *abstract.

*Primary Examiner*—Henry E. Raduazo
*Attorney, Agent, or Firm*—Sughrue, Mion, Zinn, Macpeak & Seas

[57] ABSTRACT

A floating island with a water-purifying effect of the present invention has a floating body and an agent container. The floating body includes a planter made of a foamed resin, soil contained in the planter and plants planted in the soil. A plurality of openings are provided in the bottom of the planter through which water is supplied to the soil in the planter and roots of the plants grow into water. The agent container stores an oxygen-generating agent therein, which is attached on the outside of the bottom of the planter.

14 Claims, 5 Drawing Sheets

FLOATING ISLAND WITH WATER-PURIFYING EFFECT, PLANT-CULTIVATION BAG AND METHOD FOR PURIFYING WATER

BACKGROUND OF THE INVENTION

1. Field of the Invention

The present invention relates to a floating island with a water-purifying effect which is floated on a pond or a lake for relaxing human mind with grasses and flowers planted thereon, and simultaneously, for supplying oxygen to the surrounding water to purify the water via the activation of microorganisms; a plant-cultivation bag which is put on or buried in the floating island or in a flower bed, and a method for purifying water by throwing a solid oxygen-generating agent directly into the water.

The floating island of the present invention is set afloat on ponds, lakes, etc. in gardens, golf courses, etc. The plant-cultivation bag of the present invention can be employed by putting on or burying in any place such as parks, home gardens or the floating island of the present invention. Moreover, the method for purifying water of the present invention is applicable not only to closed water systems (ponds, marshes, lakes, etc.) but also to rivers with a stagnant stream due to a small volume of water. It is also possible to set the floating island with a water-purifying effect of the present invention afloat on water which has been purified in accordance with the method of the present invention to thereby achieve a long-lasting effect of purifying the water.

2. Description of the Related Art

Water pollution has become a serious problem in ponds and lakes in a number of parks, golf courses, and the like. In the middle and lower reaches of rivers, similarly, there has arisen a serious problem of water pollution due to the industrial and domestic waste water discharged in a large amount. Water pollution not only spoils the appearance of environment but also induces troubles such as the evolution of a bad smell, extinction of fish, and the like. In order to solve the problems, there have been provided various purification equipments and materials. However, mechanical equipments are expensive and also require troublesome procedures and a high cost for the maintenance (for example, exchange of filters suffering from jamming). On the other hand, there have been employed water purifying materials including coloring agents and coagulants. However, each of them exerts only a temporary effect. Thus it is impossible thereby to sustain the water quality at an excellent level over a prolonged period of time. In addition, these conventional water purifying equipments and materials aim only at purifying water. That is, no consideration is given to, for example, the appearance of the environment.

SUMMARY OF THE INVENTION

It is an object of the present invention to provide a floating island with a water-purifying effect which requires only a simple procedure for its maintenance such as an exchange of an oxygen-generating agent, is based on a biological process in accordance with the rule of nature, and provides a good appearance and relaxation with grasses and flowers planted on the surface thereof.

It is another object of the present invention to provide a plant-cultivation bag which is highly applicable, in particular, to this floating island, since it is excellent in handleability such as an exchange of the soil or plants, transplantation, and the like.

It is another object of the present invention to provide a simple method for purifying water in which the float island is floated on water after throwing a solid oxygen-generating agent into the water.

The floating island with a water-purifying effect of the present invention which is floated on water is comprised of a floating island body including a planter made of a foamed resin, soil contained in the planter and plants planted in the soil, a plurality of openings being provided in a bottom of the planter through which water is supplied to the soil in the planter and roots of the plants grow into water; and at least one agent container which stores an oxygen-generating agent therein, the agent container being attached on an outside of the bottom of the planter.

The plant-cultivation bag of the present invention is comprised of at least one of a net-sheet having a mesh size in a range of 20 to 300 and a fabric, and cultivation soil packed therein.

The method for purifying water of the present invention is comprised of the steps of throwing a solid oxygen-generating agent directly into water, and floating the floating island of the present invention on the water.

When used in parks, golf courses and the like, the floating island of the present invention can purify the water without spoiling the surrounding natural view and the like. Also, the floating island is highly preferable for appearances and relax human mind at the same time.

By using the plant-cultivation bag of the present invention, plants can be easily planted and transplanted in flower beds, floating islands and the like.

In the purifying method of the present invention, water can be purified over a broad range simply and the water can be continuously purified.

BRIEF DESCRIPTION OF THE DRAWINGS

In the accompanying drawings.

DETAILED DESCRIPTION OF THE INVENTION

The detailed description of the present invention will be described referring to the accompanying drawings as follows.

First Embodiment

Figure 1:
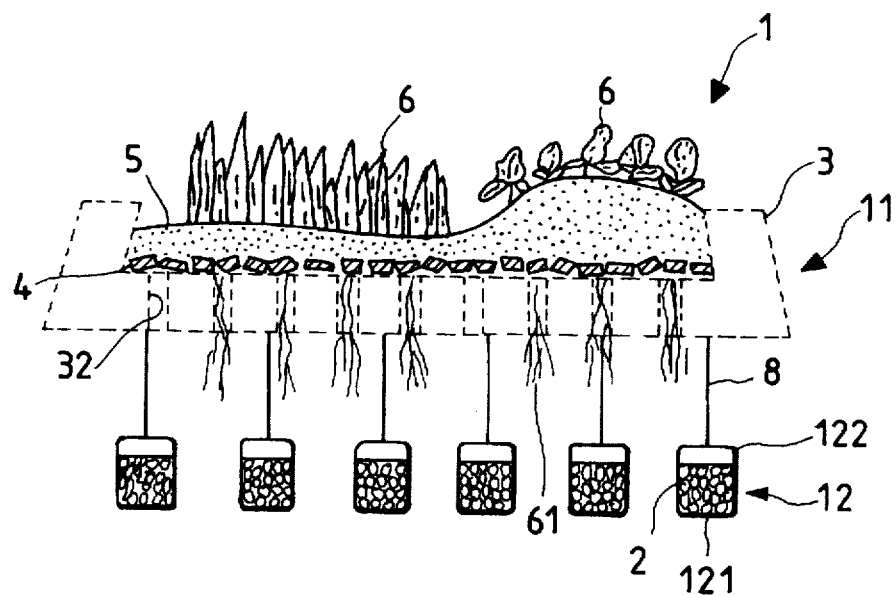
FIG. 1 is a horizontal sectional view which schematically shows a floating island with a water-purifying effect of first embodiment with the use of a porous material having a microorganism immobilized thereon.
Figure 2:
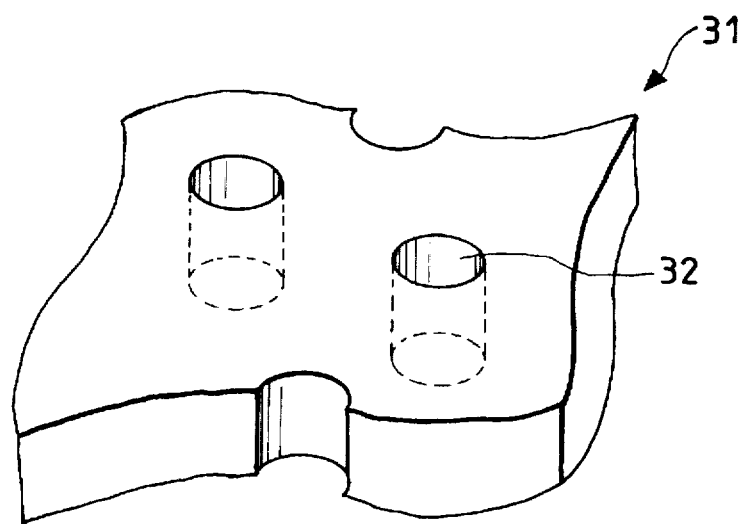
FIG. 2 is a partially enlarged perspective view of the bottom of a planter employed in the floating island of first embodiment

Referring to FIGS. 1 and 2, first embodiment of the present invention will be described.

A floating island body 11 of a floating island 1 in the first embodiment includes a planter 3 which is provided with a number of holes 32. This holes may be slits. Through these holes, water is supplied to the soil 5 in the planter 3, and the roots 61 of the plants 6 grow into the water. It is therefore preferable that these holes are provided in a large number almost uniformly all over the bottom. Further, porous materials 4 having microorganism immobilized therein is provided between the soil 5 and the planter 3.

The number, size and sectional shape of these holes 32 and the ratio of the total area of the holes 32 to the whole area of the bottom are not particularly restricted, so long as the soil 5 does not easily leak from the planter 3, the floating island 1 remains afloat and the plants 6 can grow well. These factors may be determined by taking the size, weight and buoyancy of the floating island and the plants growing therein into consideration. For example, 50 to 400 holes having a diameter of 10 to 50 mm may be formed.

Further, an oxygen-generating agent container 12 comprised of a cover 122 and a container body 121 is attached on the bottom of the planter 3 via strings 8. A solid oxygen-generating agent 2 is stored therein. The container 12 is not particularly restricted in material, shape, size, and the like. Thus one made of plastics, metals, or the like is usable therefor, so long as it can be opened and closed for the exchange of the solid oxygen-generating agent and is permeable to gas. To impart a gas permeability to the container 12, holes 123 may be formed on the wall of the container. Alternatively, the container may have a coarse network structure, and a porous sheet 124 made of non-woven cloth, cheese cloth or the like may be provided therein. Anyway, it is to be avoided that the solid oxygen-generating agent contained in the container easily leaks therefrom.

The number of the containers 12 is not particularly restricted. For example, a plurality of containers may be attached all over the bottom of the floating island almost uniformly. The number of the containers may be determined by taking the size of each container and the amount of the solid oxygen-generating agent required into consideration. Anyway, the containers including the contents are not so heavy and, moreover, the water is buoyant. Further, attention should be paid to the handleability at the exchange of the contents. Thus, it is not necessary to very rigidly attach these containers to the planter, either they are directly attached onto the outside of the bottom of the planter or hung therefrom. For example, they may be hung from the planter with the use of strings 8 for gardening, wires, or the like. The containers may be suspended in the water. When the strings corrode, they may be appropriately exchanged.

The main component of the above-mentioned solid oxygen-generating agent may be selected over a wide range, so long as the objects of the present invention can be achieved thereby. For example, calcium peroxide may be used therefor.

The size and form (for example, a powder, granules, pellets) of this oxygen-generating agent are not particularly restricted. Also, it may be in the form of a mass of a larger size.

In the present invention, it is also possible to employ the purifying effect of an aerobic microorganism immobilized on a porous material in addition to the above-mentioned solid oxygen-generating agent. As the porous material, use can be made of natural porous materials such as zeolite and perlite, and porous ceramics obtained by baking various oxides. A porous material of a larger pore size makes it easier to immobilize a microorganism. Thus it is desirable to use charcoal, which has an appropriate pore size and excellent filtering characteristics.

As the above-mentioned aerobic microorganism use can be made of yeasts belonging to the genus Geotrichum or the like, ray fungus belonging to the genus Nocardia or the like, bacteria belonging to the genus Bacillus or the like, and a combination of ray fungus belonging to the genus Aspergillus or the like with specific bacteria serving as a symbiont. In addition, such a microorganism may be employed together with inorganic components such as ferrous sulfate treated by a definite method, fermented organic materials originating in animal, humic acids or the like to thereby achieve biological and chemical synergistic effects.

Further, the surface of the soil 5 may be covered by a sheet made of net sheet or fabric. This sheet is preferably 20-mesh or above in net, and provided with opening where plants grow.

Moreover, a plant-cultivation bag 9 having soil therein may be stored in the planter 3. The plant-cultivation bag 9 is made of net sheet or fabric 91, and is provided with cuts 91 from which plants grow. However, this plant-cultivation bag is more roughly handled in, for example, transportation. Thus it is preferable to employ a net sheet or fabric having a higher strength than those employed in the second or fifth invention. It is also preferable that the net sheet or fabric has a smaller mesh size or a larger METSUKE so as to prevent the soil from leakage.

The plant-cultivation bag 9 is not particularly restricted in shape, size, and the like. Namely, these factors may be appropriately determined depending on, for example, the shape and size of the planter, the area of the place where it is located or buried, and the surrounding view. Regarding the shape, a rectangular parallelepiped bag is usually easy to handle. When the bag is to be stored into the planter, in particular, it may be in an arbitrary shape (cylinder, triangular prism, or the like) depending on the shape of the planter. Similarly, the size of the plant-cultivation bag may be appropriately determined by considering the convenience in lifting up and carrying and the size of the floating island on which the plant-cultivation bag is placed. The plant-cultivation bag may be provided with an appropriate number of openings or cuts 92 (for example, cross cut or straight one) for the growth of the plants.

Second Embodiment

Figure 3:
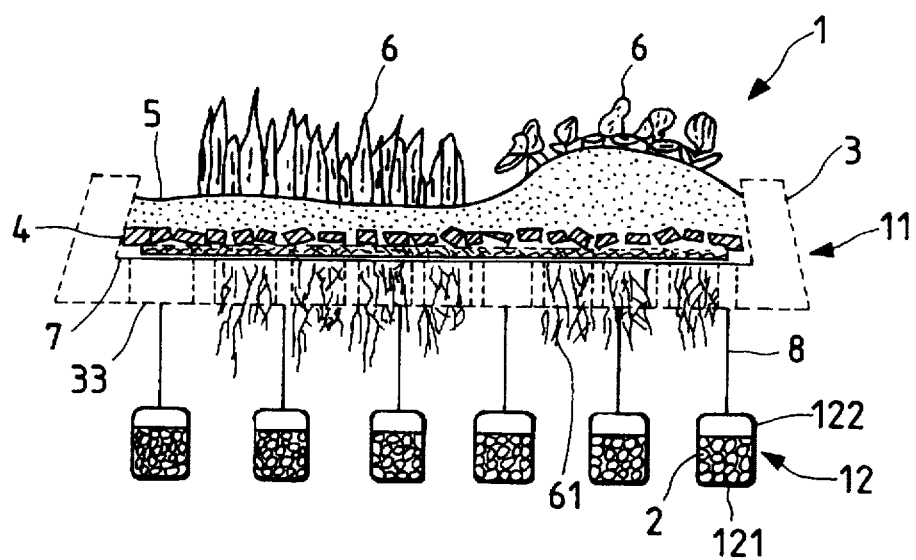
FIG. 3 is a horizontal sectional view which schematically shows a floating island with a water-purifying effect of second embodiment with the use of a porous material having a microorganism immobilized thereon.
Figure 4:
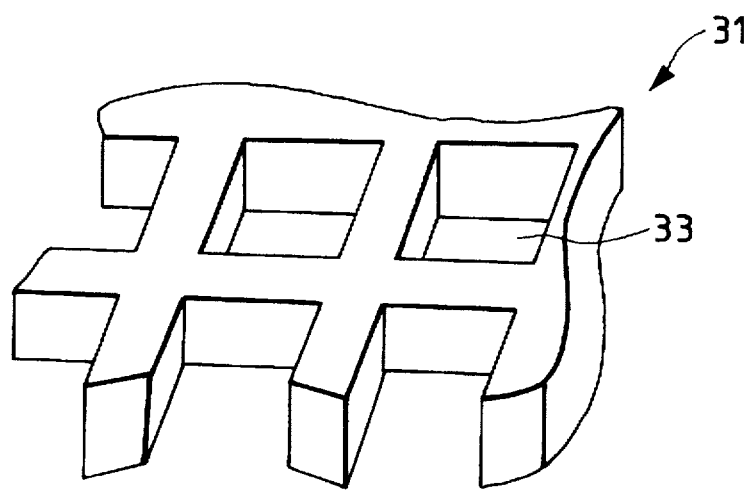
FIG. 4 is a partially enlarged perspective view of the bottom of a planter employed in the floating island of second embodiment.

Referring to FIGS. 3 and 4, second embodiment of the present invention will be described. Description of parts of this embodiment similar to that of the first embodiment is omitted here.

As shown in FIG. 4, a bottom 31 of a planter 3 of a float island in this embodiment has a network structure having a number of pores 33. This network structure may have a checked or grid pattern. Alternatively, it may be composed of a number of polygons, circles, ellipses and the like connected to each other. Compared with the holes of the first embodiment, these pores occupy a relatively large space and have a relatively large ratio of the total pore area to the whole bottom area. When the planter 3 of this embodiment is used as such, therefore, the soil 5 would easily leak into the water therefrom. Thus the whole bottom of the planter 3 is coated with a net sheet with a mesh size of 20-mesh or above or a fabric 7. As this net sheet, use can be made of cheese cloth, a metal wire net, a plastic wire net or the like. It is not preferable to use a net with such a small mesh size as to inhibit the growth of the plant roots. Namely, it is possible to use a net with a mesh size of up to 300-mesh. As the fabric, use can be made of commercially available ones (woven fabric, non-woven one, etc.) as such.

Third Embodiment

Figure 5:
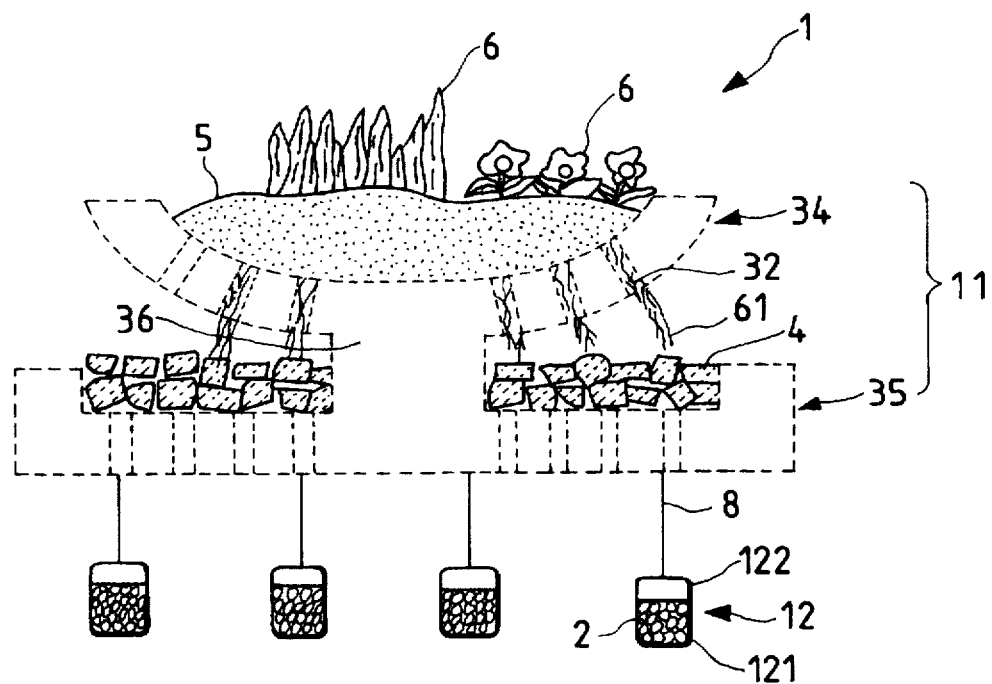
FIG. 5 is a horizontal sectional view which schematically shows a floating island with a water-purifying effect of third embodiment.
Figure 6:
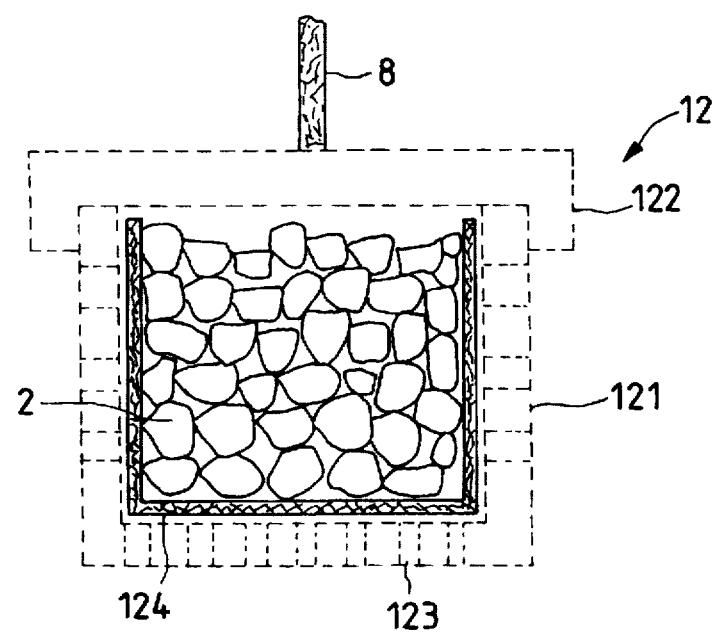
FIG. 6 is a horizontal sectional view which schematically shows a container of an oxygen-generating agent.
Figure 7:
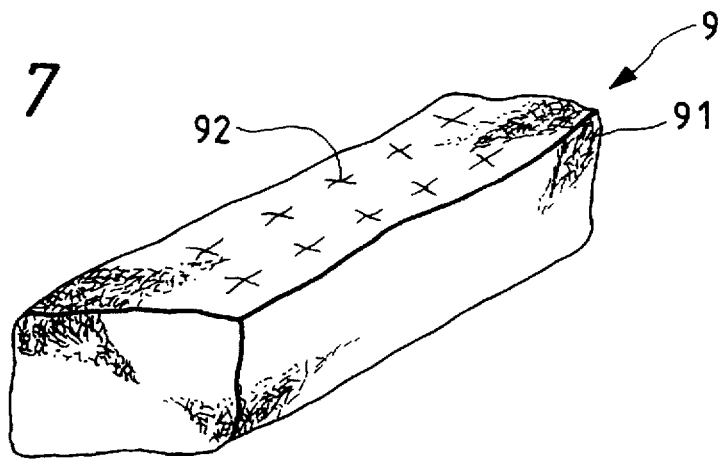
FIG. 7 is a perspective view of a plant-cultivation bag of the present invention.

Referring to FIG. 5, third embodiment of the present invention will be described. Description of same parts of this embodiment similar to that of the first embodiment is omitted here.

A float island body 11 of a float island 51 in this embodiment is constituted by a plant container 34, a microorganism container 35 and a connecting part 36 by which these containers are integrally connected each other. The plant container 34 contains the soil and the plants, at least the upper end of which is floating on the water. The microorganism container 35 is submerged and contained a porous material having a microorganism immobilized therein. Similar to the case of the first embodiment, a number of holes are provided in the bottom of the plant container and water is supplied to the plants therethrough.

In the case of this embodiment, the number, size and the like of the holes may be appropriately determined in the same manner as the one employed in the first embodiment. It is also possible, if necessary, to provide the bottom of the microorganism container with such holes. Thus water can flow into the planter from the bottom of the porous material, which promotes the purification of the water by the microorganism. The floating island of this embodiment may constituted by three parts, i.e., plant container, microorganism container and connecting part, molded integrally. Alternatively, these three parts may be separately molded and then adhered to each other by an appropriate means, for example, with the use of an adhesive.

Also, the above described second and third embodiments uses an oxygen-generating agent container 12, the sheet made of net sheet or fabric for covering the surface of the soil 5, the plant-cultivation bag 9 and the like.

According to a method for purifying water of the present invention, water can be purified by spraying or throwing the above-mentioned solid oxygen-generating agent, as uniformly as possible, in an amount which has been determined by considering the amount of the water or the stream in the case of a river and the severity of the water pollution. Although the application of the solid oxygen-generating agent in excess causes no trouble, it is disadvantageous from an economical viewpoint. It is not always necessary to use the solid oxygen-generating agent in the sufficient amount. This is because oxygen is generated at a ratio based on the amount of the oxygen-generating agent used to thereby surely and immediately improve the water qualities. It may be enough to control the concentration of the oxygen-generating agent in water to 10 to 20 ppm. However, the oxygen-generating agent may be further added, if necessary, in the case of severe water pollution.

Further in the method for purifying water of the present invention, an appropriate amount of a solid oxygen-generating agent is directly thrown into the water to thereby purify the water as described above. Immediately or after appropriate time, floating islands are set afloat at suitable points on the water while monitoring the water qualities. These floating islands may be appropriately selected from among those described in the first, second and third embodiment of the present invention while taking the appearance and the like into consideration. Thus the water can be continuously purified mainly at around each floating island. When the water qualities are deteriorated at parts distant from the floating islands, the solid oxygen-generating agent may be repeatedly thrown into the points required.

The above-mentioned planter is not restricted in the shape, size and the like. However it should float on the water surface together with the container of an oxygen-generating agent attached thereto. Accordingly, the shape and size of the planter may be determined by taking the total weight and buoyancy into consideration. Additional attention is to be paid to the maintenance operation, i.e., transplantation, the exchange of the oxygen-generating agent and the like. From these points of view, it is preferable that an area of the planter is in a range of 1 to 2 $m^2$, its depth is in a range of 10 to 30 cm and its wall thickness is in a range of 3 to 10 cm. The shape of the planter may be arbitrarily selected from among, for example, polygons (triangle, square, etc.), circle, ellipse and gourd-shape depending on the shape of the pond or lake and the surrounding view.

The planter is made of a foamed resin which is excellent in molding properties, buoyancy, cost, and the like. Most resins can be processed into foamed ones by appropriately selecting the conditions. From among these foamed resins, it is preferable to select styrene foam, polyethylene foam, polypropylene foam, polyurethane foam, and the like from the viewpoints of physical properties and cost. Among all, it is particularly preferable to use styrene foam which has been commonly employed in the art. However, styrene foam is poor in shock resistance, i.e., highly brittle. Therefore, it is advantageous to form a reinforcing film of a polyurethane elastomer on the surface of a molded styrene foam body.

Although styrene foam is not particularly restricted in the degree of foaming, foaming method and the like, it is preferable to employ the bead foaming method for producing a molded body in the form of a planter.

The above-mentioned reinforcing film can be formed by applying a two-component reactive solvent-free urethane material onto the surface of a molded styrene foam body by spraying and effecting a reaction for hardening the urethane material.

An urethane material consists of an isocyanate component and a polyol component. As the isocyanate component, those commonly employed in polyurethane elastomers such as tolylene diisocyanate, diphenylmethane diisocyanate and hexamethylene diisocyanate can be used without restriction. As the polyol component, well known ones are also usable and examples thereof include polyether polyols, polyester polyols and amine-denatured polyols prepared by introducing an amino group into an end of polyether polyol. An urethane material comprising the amine-denatured polyol has a high hardening rate, which makes it suitable for spray coating.

As a polyisocyanate to be used in the spray coating method, it is preferable to select a prepolymer with an isocyanate end which is obtained by reacting a polyol with an excessively large amount of an isocyanate. Either a polyether prepolymer or a polyester one may be used. In the present invention, use can be made of an urethane prepolymer produced by a well known method and containing about 4 to 11% of isocyanate. Although it is preferable to use a polyether prepolymer with a low viscosity, a prepolymer with a high viscosity is also usable after heating to thereby lower the viscosity.

The above-mentioned soil is not particularly restricted. Namely, either natural soil or a commercially available cultivation soil for gardening may be employed therefor. It is also possible to use a light weight soil (dry density: about 0.13 g/cm³) in order to reduce the weight of the body of the floating island. Alternatively, a mixture of these soils is also usable. Thus, an appropriate soil may be selected by considering the buoyancy of the planter, the plants growing therein and the like. Similarly, the plants planted in the soil are not particularly restricted but appropriately selected by taking the surrounding view and atmosphere into consideration. In addition to aquatic plants such as Japanese iris and skunk cabbage, common flowers and non-flowering aquatic plants such as reed are also usable therefor.

The soil in the planter may be uncovered. However it is preferable to cover the surface of the soil with a net (20-mesh or above) or a fabric. This net or fabric is not particularly restricted in the material, production method and the like, so long as it is sufficiently permeable to water and air, scarcely broken under the natural conditions of the floating island and exerts no harmful influence on the growth of the plants. For example, cheese cloth can be used as the net, while woven fabric, non-woven fabric or knitted fabric can be used as the fabric.

As the fabric, a non-woven one is preferably employed. For example, use can be made of a commercially available one made of polyester, nylon or polypropylene and having a thickness of from 0.5 to 2 mm (for example, 1 mm) without restriction. The net or fabric may be fixed by burying its end in the soil. Alternatively, it may be fixed more rigidly by adhering several sites in the end thereof to the planter with an adhesive. The net or fabric is provided with openings for the growth of the plants. The diameter of these openings may be appropriately determined depending on the type and size of the plants. It is also possible to make a cut in these openings (for example, crossly or straightly).

Similar to a natural floating island, the floating island of the present invention is to be set afloat. In the case of the floating island of the first or second embodiments, it is not so important how deep the floating island sinks in the water, so long as the soils and plants cannot easily leak from the planter. In the case where the purifying function of a microorganism is also utilized, or charcoal is used as a porous material and its purifying function is also utilized, it is desirable that the floating island sinks to such a level that the charcoal, which has a microorganism immobilized thereon and is located in the bottom of the planter, remains submerged.

It is also possible to elevate the ratio of the area of holes in the bottom of the planter to thereby make the charcoal and the microorganism to contact with a larger amount of water, as in the second embodiment. In the case of the floating island of the first embodiment having a smaller ratio of the area of holes, the purifying effects of the charcoal and the microorganism can be more efficiently utilized by promoting the flow of the water under the bottom of the planter with the use of a pump or pumping up water and sprinkling over the floating island. In the case of the third embodiment, on the other hand, the charcoal and the water are submerged and continuously contacted with water, which makes the above-mentioned procedures unnecessary. However, the effects of the charcoal and the microorganism can be fully utilized by promoting the flow of the water around them.

In ponds in parks and the like, the floating island of the present invention is scarcely used in winter. Even in winter, however, it is usable in a pool such as a school pool which also serves as a tank of water for extinguishing fires and thus contains water in winter too in an amount 3/5 times as much as in summer. In such a case, the use of the floating island of the present invention aims at protecting children from falling, drowning and the like. When these floating islands are set afloat on the pool along the edge, for example, a child falling into the pool by a mistake would be not thrown into the water but caught by the floating islands. Thus, at least a serious accident, i.e., drowning can be avoided.

When the surface of the soil is covered with a net such as cheese cloth or a non-woven fabric, the leakage of the soil from the planter due to wind or wave can be avoided. At the same time, the flow of the leaking soil into the water can be prevented so that the contamination of the water can be avoided. The net is also effective in preventing the growth of weeds. When a light weight soil (dry density: about 0.13 g/cm³) is employed as the soil, in particular, there arise a problem that the soil is blown away with the wind. It is particularly effective in such a case to use these net. In addition, rainwater or water carried on the net by the wind would be easily flow into the planter via the net. Thus no puddle is formed on the surface of the net.

The plant-cultivation bag of the present invention may be located in the planter of the floating island of the present invention. Alternatively, it may be put in plastic or wooden planters located in parks, home gardens, roadside and the like. Also, it may be located directly on the ground or buried in a hole in the soil. By using this plant-cultivation bag, plants, which have been optionally grown in, for example, a greenhouse to an appropriate size, can be carried to a place required and put in a planter of a floating island or exchanged with the existing ones. Thus the plants can be very conveniently grown and handled. It is also possible to grow plants in a flower bed in winter while in a floating island in spring and summer. From this point of view, the cultivation in the bag of the present invention is more convenient than the direct planting.

Further, eutrophication has been defined and recognized as another phenomena of organic water pollution. It has been known that phosphorus and nitrogen are required for the growth of algae which cause the eutrophication in closed water areas such as lakes and ponds. It is generally understood that the growth of algae is restricted by the phosphorus content. Calcium peroxide, which is employed in the present invention as an appropriate solid oxygen-generating agent, is also effective in eliminating phosphorus contained in water. As a result, the growth of algae is restricted, which makes it possible to prevent the eutrophication.

To further illustrate the present invention in greater detail, the following Examples will be given.

Test Examples 1 and 2

A powdery oxygen-generating agent (trade name: OH Two Power (O₂ Power); calcium peroxide powder manufactured by Daido Hokusan K. K.) was examined in the ability to supply oxygen by the following method. This oxygen-generating agent was thrown into river water and distilled water each contained in a beaker and the dissolved oxygen level was monitored with the lapse of time.

(1) Conditions for Test Example 1

Volume of water tested: 1 l. (liter)

River water: water of Neya-gawa river (collected under Sumimichi Ohashi Bridge).

Amount of oxygen-generating agent ($O_2$ Power for plant): 2 g (2) Conditions for Test Example 2:
   Volume of water tested: 3 l. (liter)
   River water: water of Neya-gawa river (collected under Imazu Hashi Bridge).
   Amount of oxygen-generating agent ($O_2$ for fish): 3 g.

TABLE 1

| | Dissolved oxygen level (mg/l of water) | | | |
|---|---|---|---|---|
| | Test Example 1 | | Test Example 2* | |
| Time Passed | Distilled Water | River Water | Distilled Water | River Water |
| 0 | 6.8 | 4.2 | 7.1 | 6.3 |
| 5 min. | 6.8 | 4.4 | 10.5 | 9.5 |
| 10 min. | 7.0 | 4.7 | 12.2 | 11.8 |
| 30 min. | 7.2 | 5.0 | 16.8 | 15.4 |
| 1 hour | 7.2 | 5.1 | 18.8 | 17.5 |
| 2 hours | 7.2 | 5.3 | 20.0 | 19.5 |
| 4 hours | 7.5 | 5.7 | 20.0 | 20.0 |
| 20 hours | 8.2 | 7.0 | 17.1 | 16.1 |
| 40 hours | 8.6 | 7.5 | 14.4 | 13.8 |

*pH non-regulated

The results given in Table 1 indicate that in Test Example 1, the dissolved oxygen level in the distilled water showed a somewhat increase of from 6.8 mg/l (starting) to 8.6 mg/l (after 40 hours), while that in the river water showed a considerable increase of from 4.2 mg/l (starting) to 7.5 mg/l. In Test Example 2 wherein no pH regulation was effected, the dissolved oxygen level in the distilled water showed a large increase of from 7.1 mg/l (starting) to 20.0 mg/l (after 2 to 4 hours), while that in the river water also showed a large increase of from 6.3 mg/l (starting) to 20.0 mg/l (after 4 hours). Although the dissolved oxygen level showed a decrease in each case, the maximum dissolved oxygen level was thrice as high as the starting level.

Thus the oxygen-generating agents employed in these Test Examples can considerably increase the dissolved oxygen in river water within a short time, which supports the effects achieved by using these oxygen-generating agents in the floating island and in the method for purifying water of the present invention. As the results of these Test Examples clearly show that oxygen was gradually supplied for a long time in Test Example 1 wherein pH value had been regulated. In Test Example 2 wherein no pH regulation was effected, on the other hand, a large amount of oxygen was generated and supplied within a short period of time and then the dissolved oxygen level showed a decrease, though the dissolved oxygen level after 40 hours was still about twice as high as the starting level. In the present invention, the pH value may be appropriately controlled by taking the severity of the water pollution, the maintenance (for example, the exchange of the oxygen-generating agent), etc. into consideration.

Test Example 3

It was examined how much orthophosphoric acid, which is one of the nutrients required for the growth of algae causing eutrophication, could be eliminated by a powdery oxygen-generating agent ($O_2$ power for plant).

This test was performed in the following manner. Orthophosphoric acid was dissolved in distilled water to thereby give solutions of ion concentrations of 42 ppm, 26 ppm and 4.5 ppm. Into each solution thus prepared was thrown the oxygen-generating agent in a definite amount depending on the ion concentration, see FIGS. 8 to 10 and the concentration was monitored with the lapse of time.

Figure 8:
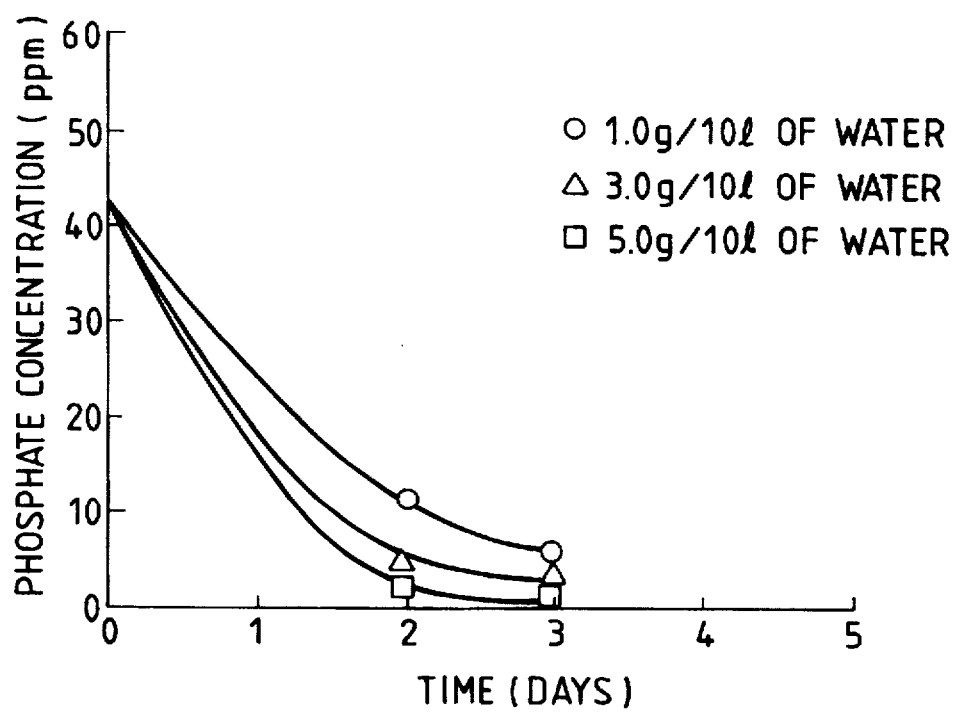
FIG. 8 is a graph which shows changes in phosphate ion concentration starting from 42 ppm with the lapse of time.
Figure 9:
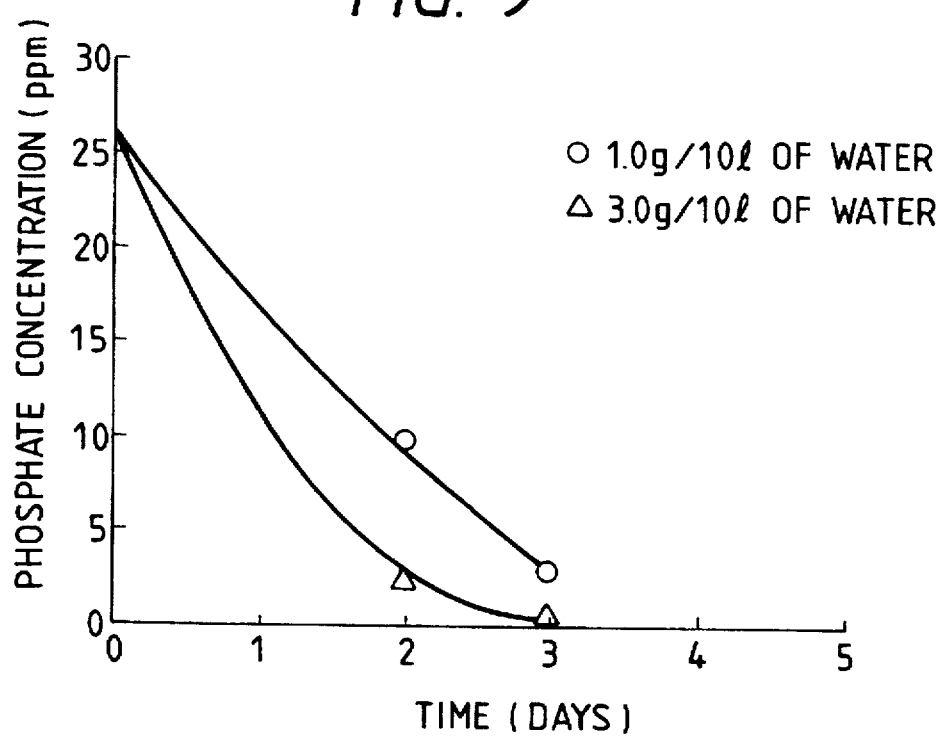
FIG. 9 is a graph which shows changes in phosphate ion concentration starting from 26 ppm with the lapse of time.
Figure 10:
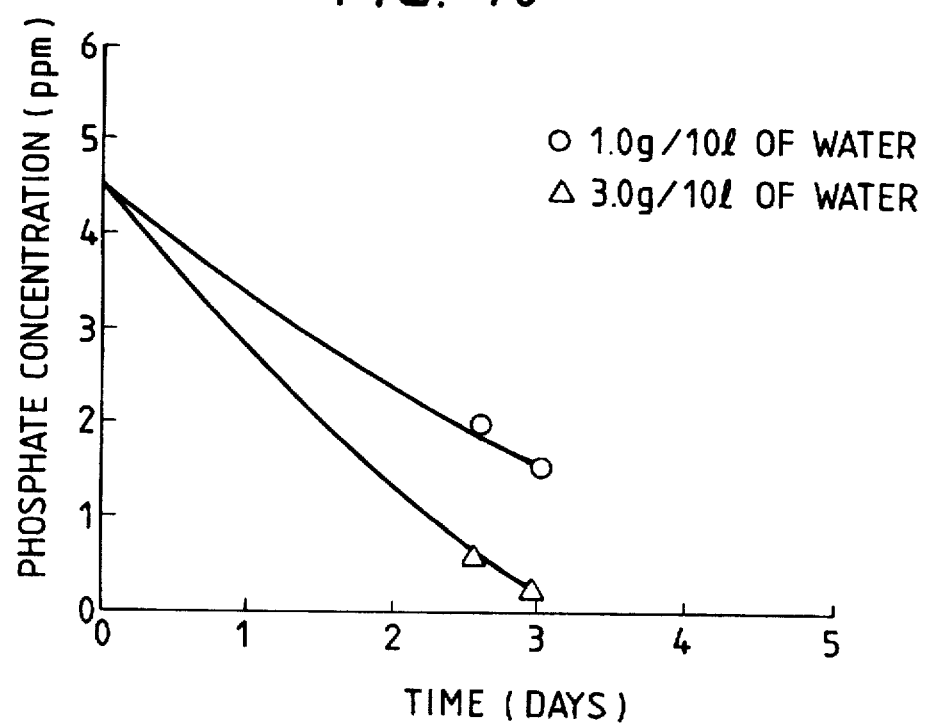
FIG. 10 is a graph which shows changes in phosphate ion concentration starting from 4.5 ppm with the lapse of time.

In natural lakes, marshes and the like, it is considered that orthophosphoric acid concentration somewhat varies from case to case. For example, the ion concentration of water in Senzoku-ike Pond (Ota-ku, Tokyo) estimated from the total content of organophosphorus compounds ranges from 4 to 10 ppm. Accordingly, the ion concentrations employed in the test, that is, 42 ppm and 26 ppm, were incredibly high in nature. As the results given in FIGS. 8 and 9 show, however, the ion concentration was lowered to about 1/10 of the starting level within a short period, i.e., 3 days by using 1 g/l of water of the oxygen-generating agent in each case. According to the result given in FIG. 10, when the starting ion concentration was low, such a remarkable effect of lowering the ion concentration as those achieved in the cases with high ion concentrations was not observed but an extremely low absolute ion concentration was achieved. The results of these tests have proved that the oxygen-generating agent is highly effective in eliminating orthophosphoric acid.

In FIGS. 8 to 10, 0 stands for a case wherein 1.0 g of the oxygen-generating agent was thrown into 10 l of distilled water; Δ stands for a case wherein 3.0 g of the oxygen-generating agent was thrown into 10 l of distilled water; and □ stands for a case wherein 5.0 g of the oxygen-generating agent was thrown into 10 l of distilled water.

EXAMPLE

A styrene foam (specific gravity: 0.03 g/cm$^3$, obtained by bead foaming) was molded into a planter (inner dimension: 100×200×20 cm, wall thickness: 5 cm). Onto the surface of this planter was applied an urethane material (flow rate ratio by volume of polyisocyanate component to polyol component: 1:1) twice or thrice at a discharge pressure of 100 to 110 kg/cm$^2$ followed by the hardening reaction to thereby form a reinforcing film of a polyurethane elastomer.

Then 200 holes (diameter: 30 mm) were formed almost uniformly all over the bottom of the planter thus obtained. Next, 500 g of charcoal having a microorganism (trade name: SNKD, manufactured by Matsumoto Biseibutsu Kenkyusho) immobilized thereon and 500 l of a light weight soil having a specific gravity of about 0.3 were introduced into the planter and 20 aquatic plant seedlings were planted therein. From the outside of the bottom of the body of the floating island thus obtained were hung 30 containers (capacity: 50 ml) of an oxygen-generating agent each containing 100 g of a powdery oxygen-generating agent (average grain size: 10 to 20 μm) at almost constant intervals with the use of strings for gardening.

In the present invention, variations may be made depending on the purpose and use within the scope of the present invention. For example, plants are not planted directly in the soil in the floating island but grown for a definite time in a plant-cultivation bag. Then the plant-cultivation bag having the plants grown therein may be put in the planter. It is also possible to fix the floating island by attaching an anchor to the bottom of the floating island. Alternatively, the floating island may be moored to the edge of the pond with a string which is pulled in at the time of a maintenance operation (the exchange of the oxygen-generating agent, etc.).

Moreover, it is possible that two or more floating islands are connected to each other via some means like a bridge while taking the shape of the pond and the appearance into consideration. Thus a good appearance can be established and the containers for an oxygen-generating agent can be attached to the bottom of the bridge. Although the outer surface of the planter may comprise the polyurethane elastomer as such, it may be patterned in wood grain, painted green, etc. to thereby give a floating island well matching the natural view and relaxing human mind.

What is claimed is:

1. A floating island with a water-purifying effect, which is floated on water comprising:
   a floating island body including a planter made of a foamed resin, soil contained in said planter and plants planted in said soil, a plurality of openings being provided in a bottom of said planter through which water is supplied to said soil in said planter and roots of said plants grow into water; and
   at least one agent container which stores an oxygen-generating agent therein, said agent container being attached on an outside of the bottom of said planter.

2. A floating island according to claim 1, wherein said plurality of openings are at least one of holes and slits.

3. A floating island according to claim 1, wherein said plurality of openings are formed of a network structure, and at least one of a net sheet having a mesh size in a range of 20 to 300 and a fabric is located on an inner surface of the bottom of said planter.

4. A floating island according to claim 1, wherein said planter is comprised of a molded styrene foam body and a reinforcing film of a polyurethane elastomer, said reinforcing film being formed by applying a two-component reactive solvent-free urethane material on the surface of said molded styrene foam body and effecting a reaction for hardening the urethane material.

5. A floating island according to claim 1, wherein a porous material having an aerobic microorganism immobilized therein is located on an inner surface of the bottom of said planter.

6. A floating island according to claim 1, wherein a surface of said soil is covered with at least one of a net having a mesh size in a range of 20 to 300 and a fabric which has openings for growth of said plants.

7. A floating island according to claim 4, wherein a porous material having an aerobic microorganism immobilized therein is located on an inner surface of the bottom of said planter.

8. A floating island according to claim 5, wherein said porous material is charcoal.

9. A floating island according to claim 7, wherein said porous material is charcoal.

10. A floating island according to claim 1, wherein said planter including: a first container portion for containing said soil and said plants therein; a second container portion for containing a porous material having an aerobic microorganism immobilized therein; and a connecting part by which said first container is integrally connected with said second container;
    further wherein a plurality of openings through which water is supplied to said soil in said planter and roots of said plants grow into water is provided in at least a bottom of said first container portion, and said agent container is attached on an outside of a bottom of said second container portion.

11. A floating island according to claim 10, wherein said planter is comprised of a molded styrene foam body and a reinforcing film of a polyurethane elastomer, said reinforcing film being formed by applying a two-component reactive solvent-free urethane material on the surface of said molded styrene foam body and effecting a reaction for hardening the urethane material.

12. A floating island according to claim 10, wherein a surface of said soil is covered with at least one of a net having a mesh size in a range of 20 to 300 and a fabric which has openings for growth of said plants.

13. A floating island according to claim 10, wherein said porous material is charcoal.

14. A floating island according to claim 1, further comprising a plant-cultivation bag contained in said planter for containing said soil and said plants therein, said bag having openings through which said plants grow, said bag being made of at least one of a net sheet having a mesh size in a range of 20 to 300 and a fabric.

* * * * *